United States Patent Office 3,751,414
Patented Aug. 7, 1973

3,751,414
3-SUBSTITUTED DERIVATIVES OR 1,3(3H)-
BENZOXAZINE-2,4-DIONE
Herbert John Havera, Edwardsburg, Mich., and Shin Hayao, Tokyo, Japan, assignors to Miles Laboratories, Inc., Elkhart, Ind.
No Drawing. Continuation-in-part of abandoned application Ser. No. 563,959, July 11, 1966. This application Sept. 13, 1971, Ser. No. 180,092
Int. Cl. C07d 87/10
U.S. Cl. 260—244 R  4 Claims

ABSTRACT OF THE DISCLOSURE

Compounds which are a series of 3-substituted derivatives of 1,3(3H)-benzoxazine-2,4-dione that are useful as analgetic agents. These compounds are prepared by reacting an appropriate N-substituted salicylamide derivative with a ring closing agent.

CROSS REFERENCES TO RELATED APPLICATIONS

This application is a continuation-in-part of U.S. patent application Ser. No. 653,959 filed July 11, 1966, now abandoned.

BACKGROUND OF THE INVENTION

The invention relates to a novel series of substituted 1,3(3H)-benzoxazine-2,4-diones in which the substituent is at the 3-position. The compounds of this invention can be represented by means of the following generic formula: formula:

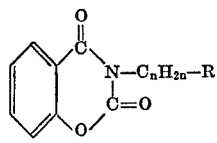

where $n$ is 2 or 3 and R represents a tertiary amino group. For example, R can be dialkylamino or polymethylene amino in which one of the methylene groups can be optionally replaced by a hetero atom such as oxygen or nitrogen and in which additionally one or more of the methylene groups can be substituted by alkyl, aryl, alkaryl, hydroxyl or alkoxyl groups. Such substituents as alkyl or aryl groups optionally can be substituted with such groups as hydroxyl, alkyl, halogen or haloalkyl radicals. For example, R can be

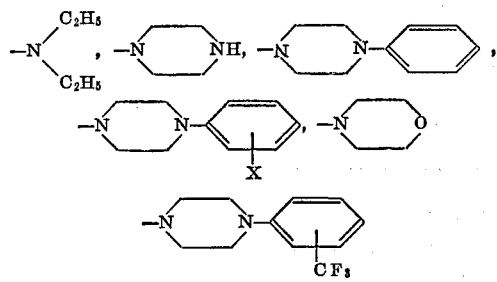

in which X is a halogen. Such novel compounds have unexpected pharmacological activity in that they elicit a potent analgetic response particularly when administered orally.

It is well recognized that few symptoms are more urgent than pain and that few classes of drugs are more useful than analgetics that are capable of safely, rapidly and conveniently alleviating such pain. Although there are a large number of factors contributing to the cause of pain, many of which are psychosomatic in origin, those skilled in the art have accepted methods of evaluating analgetic activity that yield reproducible data. These methods have been described in detail in widely available publications. Such evaluations have also been shown to yield data that relates to a number of species of animals, not just the species being used in a model.

It is further recognized that a desirable analgetic should be effected at a low dose such that a low total amount is required to obtain the desired effect.

Also, a desirable analgetic should exhibit an increasing effectiveness with increasing dose. A medication demonstrating such a property is generally said to elicit a response which is dose dependent and to possess the observed pharmacological activity. This well-known characteristic is set forth more fully, for example, in "An Introduction to Pharmacology" by Lewis, J. J. (1960), E. & S. Livingstone Ltd.; "The Pharmacological Basis of Therapeutics," Goodman, L. S. and Gilman, A., 20, (1965), The MacMillan Co., 3rd Edition; and "Phamacology and Therapeutics," Grollman, Arthur, (1965), Lea and Febiger, 6th Edition.

Potent analgetics are available that are capable of rapidly relieving severe pain. However, these analgetics have generally been found to result in an undesirable drug dependence when administered over periods of time during which relief from such pain is required. These drugs have a further limitation in that they are substantially inactive, as analgetics, when administered orally and, therefore, they must be administered parenterally. This limitation on route of administration also results in a serious restriction in relation to such medications since special equipment and sanitary conditions are required for their use. Thus, it is difficult, even when desirable, for a patient to treat himself with such analgetics.

Oral analgetics, such as acetaminophen and aspirin, although generally effective for minor pain, are not considered effective in the treatment of more severe pain. When a dose large enough to relieve severe pain is taken, there may be many side reactions. Among these reactions are nausea, sedation, and other toxic side effects.

Many compounds have been stated, in widely available publications, to be analgetic agents, i.e. to elicit an analgetic response. However, a review of the most recently published list of acceptable analgetic agents appearing in "Physician's Desk Reference" 25th edition, 1971, clearly indicates that no new analgetics that are free of serious contraindications have become available in recent years.

Some closed ring compounds that have been stated to possess analgetic activity, along with numerous other desirable pharmacological activities, are those described in U.S. Pat. No. 3,122,538 having the structural formula:

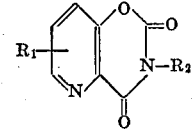

A compound of this group, 3-(2'-diethylaminoethyl) 3,4-dihydro-2,4-dioxo-2H-pyrido[2,3-e](1,3)oxazine, having a three position substituent corresponding to one of the novel compounds of this invention was evaluated for analgetic activity according to the procedure described by Bianchi, C. and Franceschini, J. in "Experimental Observations on Haffner's Method for Testing Analgesic Drugs," Brit. J. Pharmacol, 9:280 (1954). It was observed that this compound did not elicit a true analgetic response when tested according to this accepted method. The observed results of this evaluation are set forth in Table 1.

TABLE 1

| Compound | Rte. | Dose, mg./kg. | Percent failing to respond to stimulus | C.N.S. stimulation[1] | Analgetic ED₅₀,[2] mg./kg. | LD₅₀,[3] mg./kg. |
|---|---|---|---|---|---|---|
| 3-(2'-diethylaminoethyl)3,4-dihydro-2,4-dioxo-2H-pyrido[2,3-e](1,3)oxazine | i.p. | 31.6 | 0 | 0 | Not obtainable | 245 |
| | i.p. | 56.2 | 25 | 0 | do | |
| | i.p. | 100 | 20 | 0 | do | |

[1] C.N.S. stimulation: 0=none, +=slight, ++=moderate, +++=intense.
[2] ED₅₀ (median effective dose) that dose at which analgesia occurs in 50% of the individuals tested.
[3] LD₅₀ (median lethal dose) that dose at which death occurs in 50% o the individuals tested.

Other closed ring compounds that have been stated to possess analgetic activity, in addition to numerous other desirable pharmacological activities, are those described in U.S. Pat. No. 2,835,668 having the structural formula:

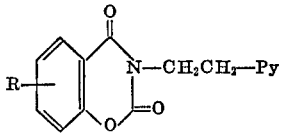

Two of the compounds of this group, 3-[2-(2-pyridylethyl)]-1,3-benzoxazine - 2,4 - dione hydrochloride and 3-[2-(4-pyridylethyl)] - 1,3-benzoxazine-2,4-dione hydrochloride were evaluated for analgetic activity substantially according to the above stated procedure. It was observed that the first stated compound did not elicit analgetic activity when administered intraperitoneally or orally. With this first compound substantial central nervous system stimulation was observed. The second compound was observed to elicit an analgetic response when administered intraperitoneally in spite of moderate central nervous system depression. However, when this latter compound was administered orally no analgetic activity was observed even up to doses (562.0 and 682.0 mg./kg.) at which the test animals went into convulsions. Accordingly, it can be stated that these compounds do not meet the desirable characteristc of oral efficacy sought from a beneficial analgetic. The observed results for these compounds are set forth in Table 2.

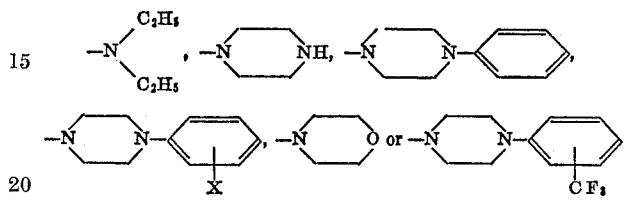

in which X is a halogen, or acid addition salts thereof. These compounds have useful pharmacological activity. For example, they display unexpected pharmacological activity of a beneficial nature in that they have been found to possess potent analgetic activity. Particularly, these compounds elicit a potent analgetic response when administered by the sought after and advantageous oral route.

DESCRIPTION OF THE PREFERRED EMBODIMENTS

The compounds of this invention can be readily prepared by reacting the appropriate N-substituted salicylamide derivative with a ring closing agent. Such agent furnishes a carbonyl group to close a ring to form a benzoxazine dione derivative. Such compounds include phosgene, alkyl haloformates and alkyl halocarbonates. The reaction can be conveniently carried out in the presence of a suitable solvent such as xylene or acetonitrile. A base, for example, pyridine, can also be used

TABLE 2

| Compound | Rte. | Dose, mg./kg. | Percent failing to respond to stimulus | C.N.S. stimulation | Analgetic ED₅₀, mg./kg. | LD₅₀, mg./kg. |
|---|---|---|---|---|---|---|
| 3-[2-(2-pyridylethyl)]-1,3-benzoxazine-2,4-dione hydrochloride | i.p. | 46.4 | 0/20 | 0 | Not obtainable | |
| Do | i.p. | 56.2 | 3/20 | + | do | |
| Do | i.p. | 68.2 | 5/20 | + | do | 340 |
| Do | i.p. | 82.6 | 14/20 | ++ | do | |
| Do | i.p. | 100.0 | 20/20 | +++ | do | |
| Do | p.o. | 147.0 | 1/5 | + | do | |
| Do | p.o. | 178.0 | 2/5 | + | do | |
| Do | p.o. | 215.0 | 4/5 | ++ | do | |
| Do | p.o. | 261.0 | 5/5 | +++ | do | |
| 3-[2-(4-pyridylethyl)]-1,3-bnezoxazine-2,4-dione hydrochloride | i.p. | 100.0 | 2/10 | 0 | 116 | 320 |
| Do | i.p. | 121.0 | 6/10 | 0 | | |
| Do | i.p. | 147.0 | 9/10 | 0 | | |
| Do | p.o. | 178.0 | 1/5 | 0 | Not obtainable | |
| Do | p.o. | 215.0 | 2/5 | 0 | do | |
| Do | p.o. | 261.0 | 1/5 | 0 | do | |
| Do | p.o. | 464.0 | 1/5 | 0 | do | |
| Do | p.o. | 562.0 | 1/5 | 0 | do | |
| Do | p.o. | 682.0 | 1/5 | 0 | do | |

NOTE.—See footnotes, Table 1.

SUMMARY OF THE INVENTION

This invention is embodied in a series of compounds having the following structural formula:

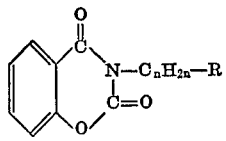

in which $C_nH_{2n}$ is a straight chain alkylene, $n$ is 2 or 3 and R is if desired. The process of preparation can be illustrated by means of the following equation:

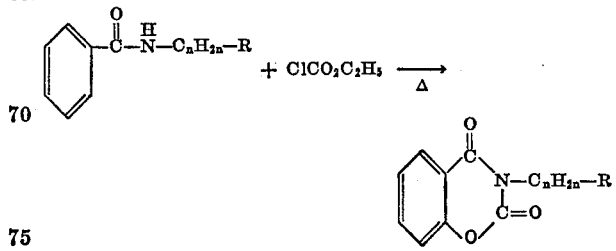

The compounds of this invention can be prepared in the form of their free bases or salts thereof. In addition various salts can be prepared by reaction with the appropriate acid. Although in general pharmacologically acceptable salts are preferred, other salts, even toxic salts, can be formed for use in purifying or separating the compounds of this invention.

Medications may be prepared including at least one of the novel compounds of this invention as an active ingredient in the form of the free base or pharmacologically acceptable acid addition salt thereof. Such medications may be conveniently prepared by combining the active ingredient with a pharmaceutical vehicle including components selected from the fillers, carriers, extenders, excipients, and the like generally used in pharmaceutical formulations. Medications may be prepared in the solid state as tablets or capsules or in the liquid state as solutions or suspensions. Similar dosage forms suitable for oral, subcutaneous, intraperitoneal, or other convenient means of administration can also be provided. The pharmaceutical vehicle may also include common diluents or tableting adjuncts such as cellulose powder, cornstarch, lactose, talc and such, used according to accepted pharmaceutical manufacturing practices. Unit dosages (a specific weight, such as mg. or g.) of active ingredient in a medication may be varied so that an adequate amount is present to provide a desired therapeutic dose without untoward side effects. A therapeutic dose is considered as the ratio of the weight of active ingredient administered to a patient's body weight, usually expressed as mg./kg., that elicits a desired therapeutic result.

This invention will be better understood by reference to the following examples which are not to be construed as limiting the scope of this invention which is defined in the claims appended hereto.

EXAMPLE 1

(A) 3-[3-(4-phenyl-1-piperazinyl)propyl]-1,3(3H)-benzoxazine-2,4-dione

To 10.0 g. (0.029 mole) of 4-phenyl-1-[3-(o-hydroxybenzamido)propyl]piperazine was added 100 ml. of pyridine, 60 ml. of acetonitrile and 4.0 g. (0.03 mole) of ethyl chlorocarbonate dropwise at 5° C. After the addition of ethyl chlorocarbonate the mixture was distilled until the internal temperature reached 122° C. The resulting solution was then refluxed for 1 hour. After cooling the mixture, water was added and a white precipitate followed. The solid was recrystallized two times from a chloroform, methanol solution. Yield 11.0 g., M.P. 126°–128° C.

Analysis.—Calcd. for $C_{21}H_{23}N_3O_3$ (percent): N (basic), 3.84; N (total), 11.51. Found (percent): N (basic), 3.82; N (total), 11.60.

(B) 3-[3-(4-phenyl-1-piperazinyl)propyl]-1,3(3H)-benzoxazine-2,4-dione maleate

The maleate salt was prepared by adding 3.48 g. (0.03 mole) of maleic acid to the free base in methanol. The solution was heated on a steam bath for 15 minutes. Upon cooling a precipitate formed which was filtered and recrystallized from a methanol, chloroform mixture. Yield 10.0 g., M.P. 174°–175° C.

Analysis.—Calcd. for $C_{25}H_{27}N_3O_7$ (percent): N (basic), 2.91; N (total), 8.73. Found (percent): N (basic), 2.88; N (total), 8.90.

EXAMPLE 2

(A) 3-[3-(4-m-chlorophenyl-1-piperazinyl)propyl]-1,3(3H)-benzoxazine-2,4-dione

To 24.0 g. (0.07 mole) of 4-m-chlorophenyl-1-[3-(o hydroxybenzamido)propyl]piperazine was added 100 ml. of dry pyridine and 60 ml. of acetonitrile. To this solution was added 7.5 g. (0.07 mole) of ethyl chloroformate dropwise so that the temperature never rose above 5° C. After the addition of ethyl chloroformate the mixture was distilled until the internal temperature was 122° C. The reaction mixture was then refluxed for 1 hour. Water was added to precipitate the product which was filtered and recrystallized from a chloroform, methanol solution twice. Yield 8.0 g., M.P. 104°–105° C.

Analysis.—Calcd. for $C_{21}H_{22}ClN_3O_3$ (percent): N (basic), 3.50; N (total), 10.52. Found (percent): N basic), 3.47; N (total), 10.72.

(B) 3-[3-(4-m-chlorophenyl-1-piperazinyl)propyl]-1,3(3H)-benzoxazine-2,4-dione maleate The maleate salt was prepared by adding 2.32 g. (0.02 mole) of maleic acid to the 8.0 g. (0.02 mole) of free base in methanol. The mixture was heated on the steam bath for 15 minutes and then allowed to cool. A precipitate formed which was filtered and recrystallized from a methanol, chloroform solution twice. Yield 7.0 g., M.P. 172°–173° C.

Analysis.—Calcd. for $C_{25}H_{26}ClN_3O_7$ (percent): N (basic), 2.71; N (total), 8.14. Found (percent): N (basic), 2.70; N (total), 8.03.

EXAMPLE 3

3-(2-diethylaminoethyl)-1,3(3H)-benzoxazine-2-4-dione hydrochloride

To 18.0 g. (0.076 mole) of diethylaminoethyl salicylamide was added 100 ml. of pyridine and 60 ml. of acetonitrile. To this solution was added 8.2 g. (0.076 mole) of ethyl chloroformate while keeping the temperature at 5° C. After the addition of ethyl chloroformate the mixture was distilled until the internal temperature was 122° C. At this point a solid precipitated from the reaction mixture. The material was filtered and recrystallized three times form a methanol, ether mixture. Yield 13.0 g., M.P. 232°–233° C.

Analysis.—Calcd. for $C_{14}H_{19}ClN_2O_3$ (percent): N (basic), 4.69; N (total), 9.35. Found (percent): N (basic), 4.69; N (total), 9.33.

EXAMPLE 4

(A) 3-(3-morpholinopropyl)-1,3(3H)-benzoxazine-2,4-dione

To 41.0 g. (0.15 mole) of 3-morpholinopropyl salicylamide was added 100 ml. of dry pyridine and 60 ml. of acetonitrile. To this solution was then added 16.3 g. (0.15 mole) of ethyl chloroformate at 5° C. The addition was made so that the temperature never rose above 10° C. The mixture was then distilled until the internal temperature reached 122° C. The resulting solution was refluxed for an additional hour. After cooling, a solid precipitated which was filtered and treated with a dilute ammonium hydroxide solution. The organic layer was extracted with chloroform and the chloroform was removed in vacuo leaving an oily residue. The oil crystallized upon addition of n-hexane. The solid was recrystallized three times from a chloroform, n-hexane mixture. Yield 10.0 g., M.P. 88°–89° C.

Analysis.—Calcd. for $C_{15}H_{18}N_2O_4$ (percent): N (basic), 4.83; N (total), 965. Found (percent): N (basic), 4.80; N (total), 9.81.

(B) 3-(3-morpholinopropyl)-1,3-(3H)-benzoxazine-2,4-dione hydrochloride

The hydrochloride salt was prepared by suspending the free base in methanol and bubbling anhydrous hydrogen chloride through the mixture. The material which precipitated was recrystallized from a methanol, ether mixture, Yield 6.5 g., M.P. 227°–228° C.

Analysis.—Calcd. for $C_{15}H_{19}ClN_2O_4$ (percent): N (basic), 4.28; N (total), 8.57. Found (percent): N (basic), 4.26; N (total), 8.67.

EXAMPLE 5

3 - [3 - (4 - m-trifluoromethylphenyl - 1 - piperazinyl) propyl] - 1,3(3H) - benzoxazine - 2,4 - dione hydrochloride

TABLE 3

| Compound | Rte. | Dose, mg./kg. | No failing to respond to stimulus | C.N.S. stimulation | Analgetic ED$_{50}$, mg./kg. | LD$_{50}$, mg./kg. |
|---|---|---|---|---|---|---|
| 3-(2-diethylaminoethyl)-1,3(3H)-benzoxazine-2,4-dione hydrochloride | i.p. | 46.4 | 2/10 | 0 | | |
| Do | i.p. | 56.2 | 5/10 | 0 | 56.5 | 98 |
| Do | i.p. | 68.2 | 7/10 | + | | |
| Do | i.p. | 82.6 | 10/10 | +++ | | |
| Do | p.o. | 68.2 | 2/10 | 0 | | |
| Do | p.o. | 82.6 | 5/10 | 0 | 84.6 | 225 |
| Do | p.o. | 100.0 | 7/10 | 0 | | |
| Do | p.o. | 121.0 | 9/10 | +++ | | |

NOTE.—See footnotes, Table 1.

To 20.0 g. (0.05 mole) of 4-m-trifluoromethylphenyl-1-[3 - (o-hydroxybenzamido)propyl]piperazine was added 100 ml. of pyridine and 60 ml. of acetonitrile. To this mixture was then added 5.4 g. (0.05 mole) of ethyl chloroformate dropwise at 5° C. After the addition of ethyl chloroformate the mixture was distilled until the internal temperature was 122° C. Approximately 120 ml. of distillate was collected. The resulting solution was then refluxed for an additional hour. The mixture was cooled and anhydrous ether was added to precipitate the product. The solid was filtered and recrystallized five times from a methanol, ether mixture. Yield 4.5 g., M.P. 231°–233° C.

*Analysis.*—Calcd. for C$_{22}$H$_{23}$ClF$_3$N$_3$O$_3$ (percent): N (basic), 2.99; N (total), 8.95. Found (percent): N (basic), 2.95; N (total), 8.84.

EXAMPLE 6

3-(2-diethylaminoethyl)-1,3(3H)-benzoxazine 2,4-dione hydrochloride

To 0.2 g. of diethylaminoethyl salicylamide in 5 ml. of xylene was added 100 mg. (0.00085 mole) of ethyl chloroformate. The mixture was heated to boiling and refluxed for 20 minutes. The solid that formed was filtered and recrystallized from a methanol, ether mixture. Yield: 0.20 g. (77%), M.P. 231°–232° C.

*Analysis.*—Calcd. for C$_{14}$H$_{19}$ClN$_2$O$_3$ (percent): N (basic), 4.69; Found (percent): N (basic), 4.66.

EXAMPLES 7 AND 8

The analgesic activity of the novel compounds of this invention were evaluated substantially according to the procedure described by Bianchi, C. and Franceschini, J. in "Experimental Observations on Haffner's Method for Testing Analgesic Drugs" Brit. J. Pharmacol, 9:280 (1954). A specific dose of the compound was administered to randomly selected mice. After 30 minutes a noxious stimulus in the form of an artery clip with the branches enclosed in a thin rubber tube was applied to the root of the tail of each mouse tested. The mouse's attempts to remove the artery clip was observed and recorded.

The observed results for i.p. and p.o. routes of administration are set forth in Table 3.

It was observed that this compound elicited an analgetic response when administered by the i.p. and p.o. routes that was substantially free of adverse side effects. Further, it was observed that the responses elicited was dose dependent for both routes of administration.

In summary this invention provides a series of 3-substituted derivatives of 1,3(3H)-benzoxazine-2,4-diones, which are useful as pharmacological agents.

What is claimed is:

1. A compound of the formula:

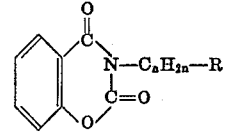

where C$_n$H$_{2n}$ is a straight chain alkylene in which $n$ is 2 or 3 and R is

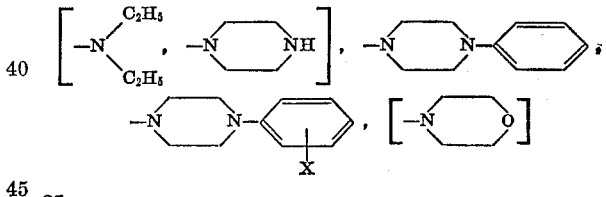

or

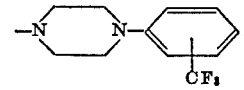

in which X is a halogen, or pharmacologically acceptable acid addition salts thereof.

2. A compound according to claim 1 which is 3-[3-(4 - phenyl - 1 - piperazinyl)propyl] - 1,3(3H) - benzoxazine-2,4-dione.

3. A compound according to claim 1 which is 3-[3-(4-m-chlorophenyl - 1 - piperazinyl)propyl] - 1,3-(3H)-benzoxazine-2,4-dione.

4. A compound according to claim 1 which is 3-[3-(4-m - trifluoromethylphenyl - 1 - piperazinyl)propyl] - 1,3-(3H)-benzoxazine-2,4-dione.

References Cited

UNITED STATES PATENTS

| 3,528,974 | 9/1970 | Engel | 260—244 R |
| 3,122,538 | 2/1964 | Clauson-Kaas et al. | 260—244 R |
| 2,835,668 | 5/1958 | Shapiro et al. | 260—244 R |

OTHER REFERENCES

Ex parte Engel, available in U.S. patent file 3,528,974, Paper No. 18 (3 pages).

NATALIE TROUSOF, Primary Examiner

U.S. Cl. X.R.

260—247.2 A, 248 Ph, 268 MK, 558 R; 424—248